(12) United States Patent
Williams

(10) Patent No.: US 11,125,208 B2
(45) Date of Patent: Sep. 21, 2021

(54) RECIPROCAL MOTION WIND ENERGY HARVESTING DEVICE

(71) Applicant: Johnnie Ace Williams, Sand Springs, OK (US)

(72) Inventor: Johnnie Ace Williams, Sand Springs, OK (US)

( * ) Notice: Subject to any disclaimer, the term of this patent is extended or adjusted under 35 U.S.C. 154(b) by 146 days.

(21) Appl. No.: 16/503,465

(22) Filed: Jul. 3, 2019

(65) Prior Publication Data

US 2020/0011293 A1  Jan. 9, 2020

Related U.S. Application Data

(60) Provisional application No. 62/693,581, filed on Jul. 3, 2018.

(51) Int. Cl.
| | |
|---|---|
| *F03D 5/06* | (2006.01) |
| *F03D 3/00* | (2006.01) |
| *F03D 3/06* | (2006.01) |
| *F01D 15/10* | (2006.01) |

(52) U.S. Cl.
CPC ............... *F03D 5/06* (2013.01); *F01D 15/10* (2013.01); *F03D 3/005* (2013.01); *F03D 3/067* (2013.01)

(58) Field of Classification Search
CPC . F03D 5/06; F03D 15/10; F03D 3/005; F03D 3/067

USPC ................. 416/79, 81–83, 99, 100, 103–106
See application file for complete search history.

(56) References Cited

U.S. PATENT DOCUMENTS

| | | | |
|---|---|---|---|
| 4,109,465 A | 8/1978 | Plen | |
| 6,717,284 B2 | 4/2004 | Lin | |
| 7,880,323 B2* | 2/2011 | Menges | ................. F03D 3/005 |
| | | | 290/55 |
| 8,206,106 B2* | 6/2012 | Syrovy | ..................... F03D 9/25 |
| | | | 416/83 |
| 8,821,120 B1* | 9/2014 | Pandit | ..................... F03D 15/10 |
| | | | 416/17 |
| 2004/0160059 A1 | 8/2004 | Pandian | |
| 2012/0171035 A1* | 7/2012 | Fransen | ................ F03B 17/067 |
| | | | 416/17 |

FOREIGN PATENT DOCUMENTS

FR    2808845 A1   11/2001

\* cited by examiner

*Primary Examiner* — Woody A Lee, Jr.
*Assistant Examiner* — Brian O Peters

(57) ABSTRACT

A reciprocal motion wind energy harvesting device has a first lever arm assembly and a second lever arm assembly, which are supported by and rotate about a central shaft. The lever arm assemblies have pluralities of vanes along their length to receive wind force. The vanes are configured to be rotatable in order to produce opposing and reciprocating motion of the lever arm assemblies. The lever arm assemblies are operatively connected to a generator in order to convert the wind force received by the vanes into energy.

16 Claims, 17 Drawing Sheets

RECIPROCAL MOTION WIND ENERGY HARVESTING DEVICE

The current application claims a priority to the U.S. Provisional Patent application Ser. No. 62/693,581 filed on Jul. 3, 2018.

FIELD OF THE INVENTION

The present invention relates generally to wind-harnessing generators. More particularly, the present invention relates to wind-harnessing generators that transform mass current flow to compressive and/or electrical power.

BACKGROUND OF THE INVENTION

In the present times, individuals are always looking for ways to innovate wind powered technologies. Conventional systems known in the art, such as wind-turbines are often complex and expensive to develop/construct. Additionally, wind-turbines often operate at an optimal height that may be unsuitable for urban environments. Furthermore, wind turbines are susceptible to damage due to the fact that they cannot be strutted along the mast.

The present invention aims to solve these problems. The present invention utilizes a self-oscillating motion/mechanism that is constructed out of cost effective, lightweight, and simple pneumatic/electrical parts. Additionally, the present invention can be deployed from the grounds-up, such that it inflates itself up to an optimal height.

The present invention can also be lifted as a high-flying "self-oscillating" kite, such that the chassis of the present invention acts as lift generating air foils. Furthermore, the present invention can be hoisted from the optimal height, due to horizontal profile of the self-oscillating motion/mechanism. In another embodiment, the present invention can be adapted to accept undercurrents associative with rivers and/or ocean currents.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention

DETAIL DESCRIPTIONS OF THE INVENTION

Figure 1:
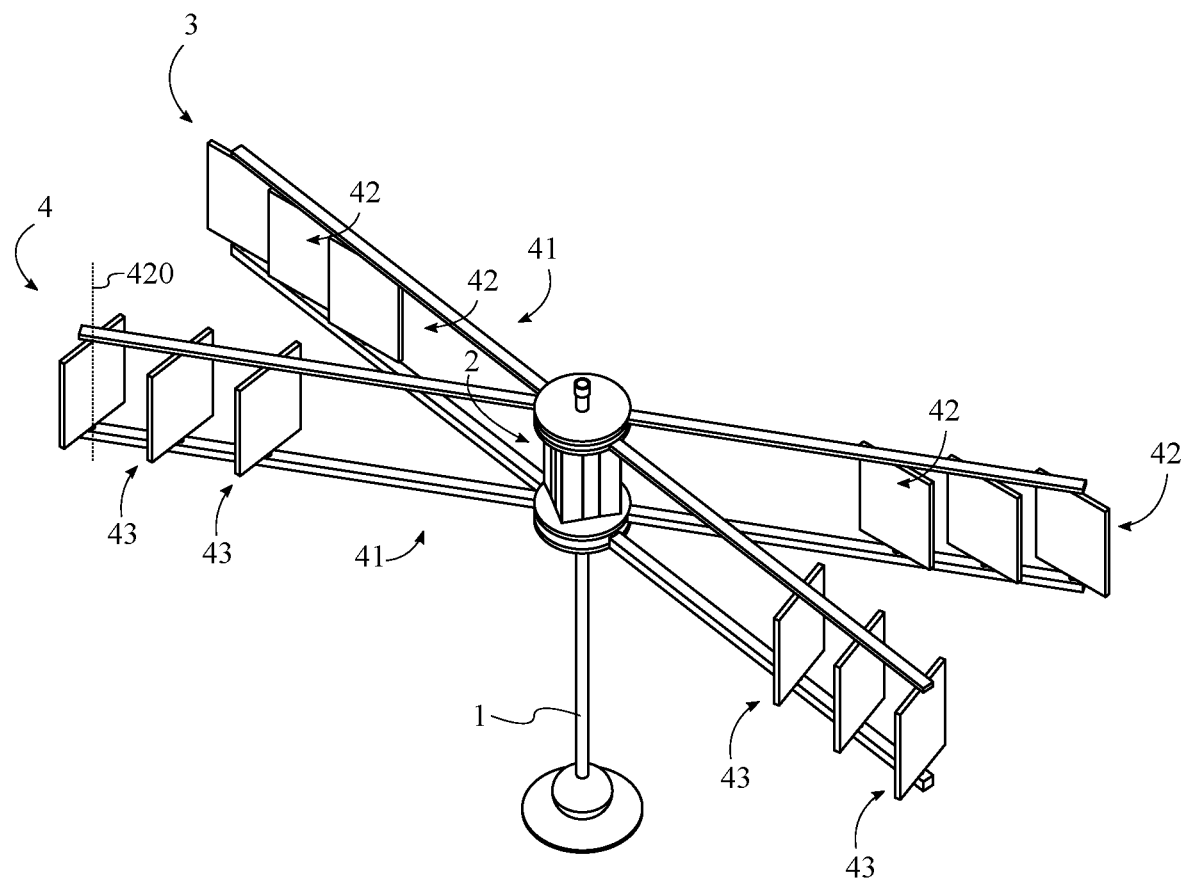
FIG. 1 is a perspective view of the present invention with the lever arm assemblies oriented at a first angle.
Figure 2:
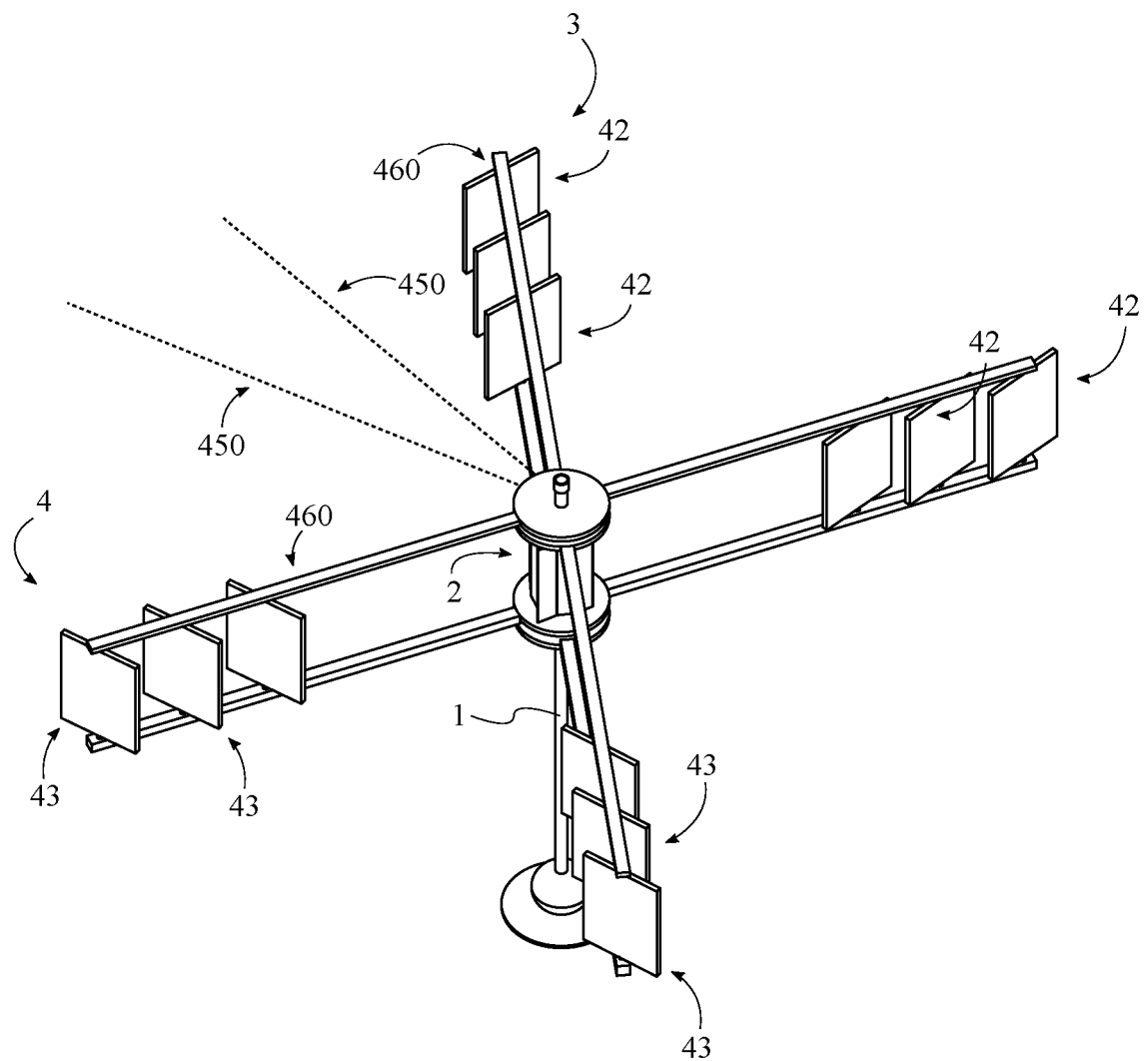
FIG. 2 is a perspective view of the present invention with the lever arm assemblies oriented at a second angle.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a device for converting wind energy into mechanical or electrical energy. Referring to FIGS. 1-4, the preferred embodiment of the present invention generally comprises a central shaft 1, a generator 2, a first lever arm assembly 3, and a second lever arm assembly 4. The first lever arm assembly 3 and the second lever arm assembly 4 are each rotatably and concentrically connected with the central shaft 1. The central shaft 1 mainly acts as a support member for the first lever arm assembly 3 and the second lever arm assembly 4, supporting them at a desired height in order to adequately capture wind energy. The central shaft 1 may vary in height. The central shaft 1 may be affixed into the ground or may be connected to a base for stabilization. The first lever arm assembly 3 and the second lever arm assembly 4 intersect with each other at the central shaft 1, and are able to rotate independently of each other about the central shaft 1. Preferably, the first lever arm assembly 3 and the second lever arm assembly 4 are oriented generally perpendicular to the central shaft 1, through said orientation may vary in different embodiments. Furthermore, the first lever arm assembly 3 and the second lever arm assembly 4 are each configured to rotate between a first angle 450 and a second angle 460 about the central shaft 1, so that the first lever arm assembly 3 and the second lever arm assembly 4 are each constrained to a specified arc about the central shaft 1. In some embodiments, the specified arc is approximately 45 degrees. The first and second lever arm assemblies rotate reciprocatingly and opposingly along the 45 degree arc due to force applied by ambient wind, and the rotation of the lever arm assemblies is converted to mechanical or electrical energy through the generator 2.

The first lever arm assembly 3 and the second lever arm assembly 4 are operatively connected to the generator 2, wherein the generator 2 is configured to produce power through rotational motion of the first lever arm assembly 3 and the second lever arm assembly 4 about the central shaft 1. The generator 2 may vary in different embodiments, and may be any type of generator 2 suitable for utilizing the rotational motion of the first lever arm assembly 3 and the second lever arm assembly 4 to produce mechanical or electrical energy or work.

In the preferred embodiment, the first lever arm assembly 3 and the second lever arm assembly 4 each comprise a support frame 41, a first plurality of vanes 42, a second plurality of vanes 43, and a vane rotation mechanism 44. Each of the first plurality of vanes 42 and the second plurality of vanes 43 is a generally flat or curved planar member configured to maximize surface area contact with any passing wind. The first plurality of vanes 42 and the second plurality of vanes 43 are rotatably connected to the support frame 41. More particularly, in the preferred embodiment, each of the first plurality of vanes 42 and the second plurality of vanes 43 are rotatable about a vane axis 420 that is oriented vertically, or parallel to the central shaft 1. The first plurality of vanes 42 is positioned opposite the second plurality of vanes 43 along the support frame 41.

Figure 3:
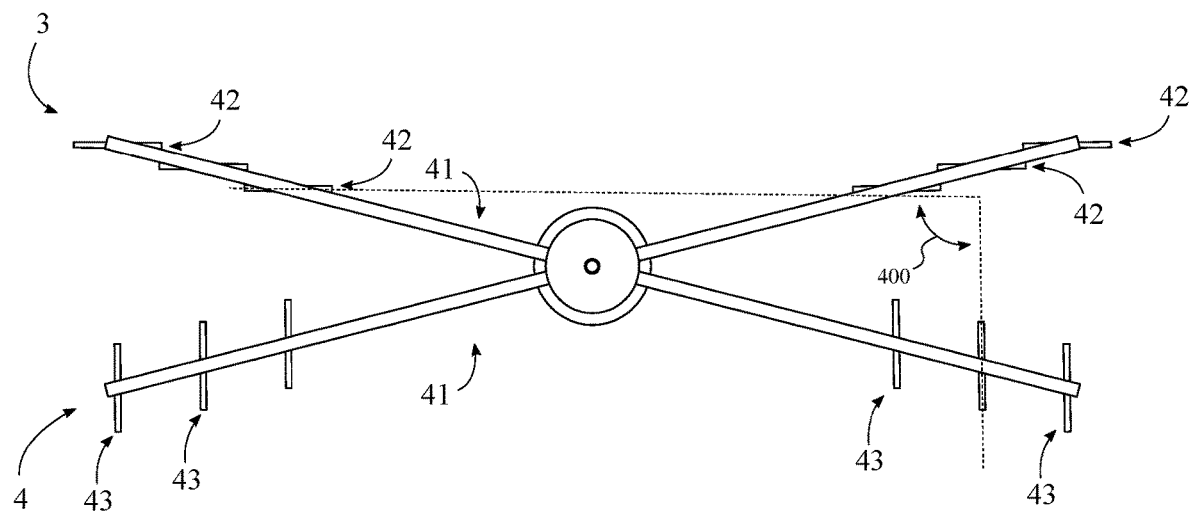
FIG. 3 is a top view of the present invention with the lever arm assemblies oriented at the first angle.
Figure 4:
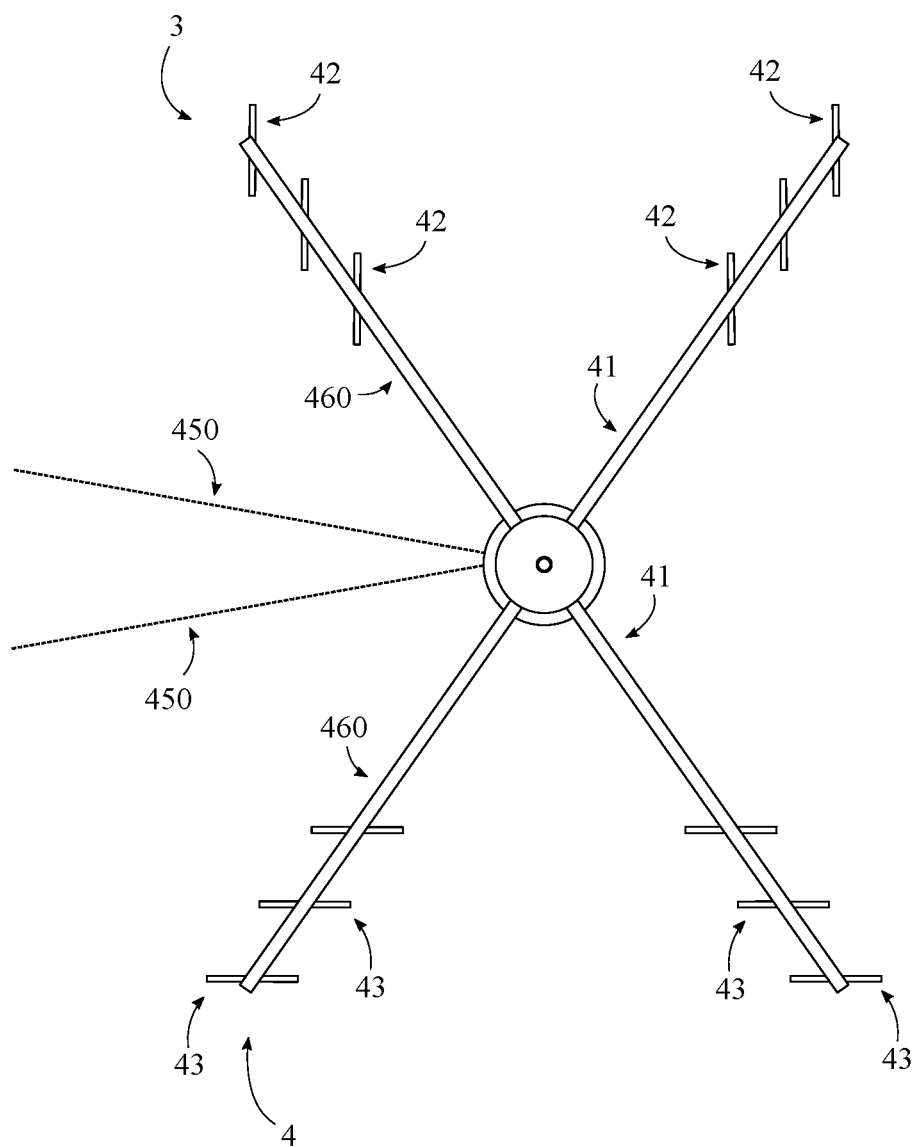
FIG. 4 is a top view of the present invention with the lever arm assemblies oriented at the second angle.
Figure 5:
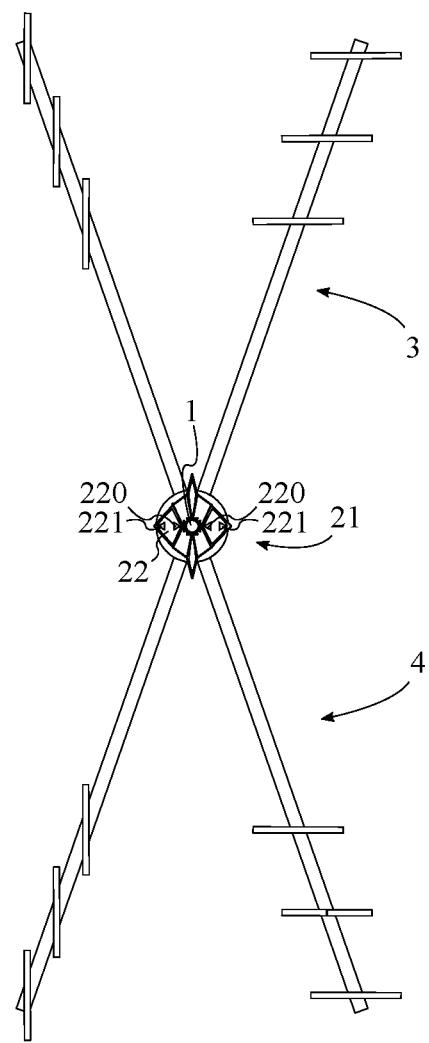
FIG. 5 is a top cross-sectional view of the present invention illustrating the bellows assembly in an exemplary uncompressed state.
Figure 6:
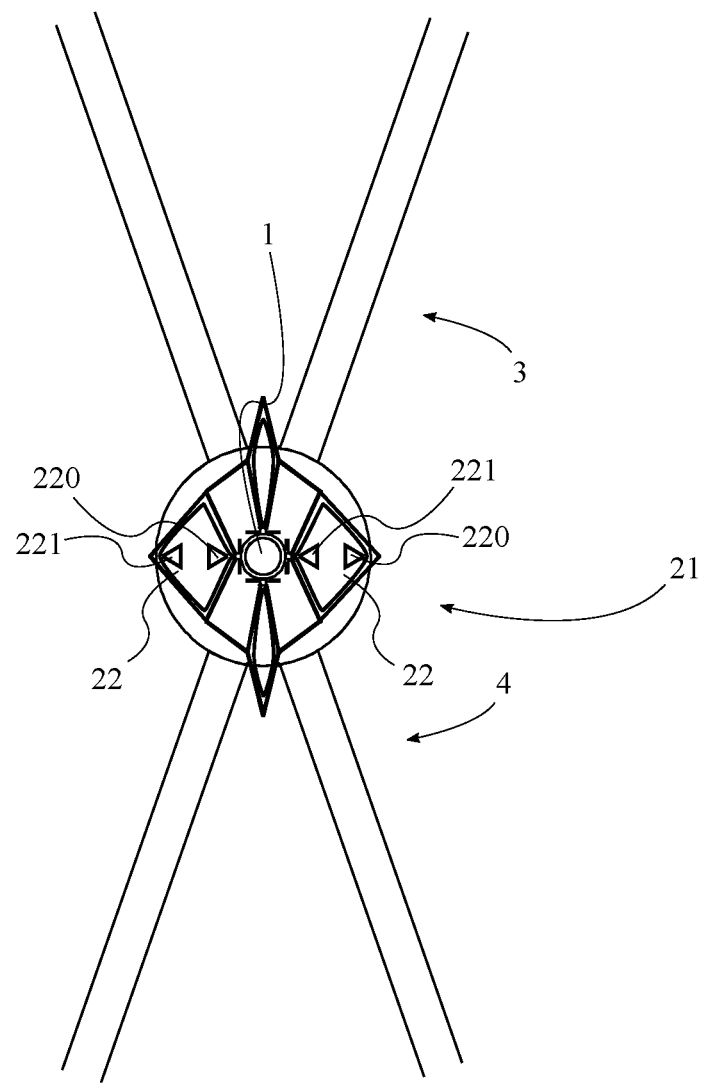
FIG. 6 is a detail view of the bellows assembly of FIG. 5.
Figure 7:
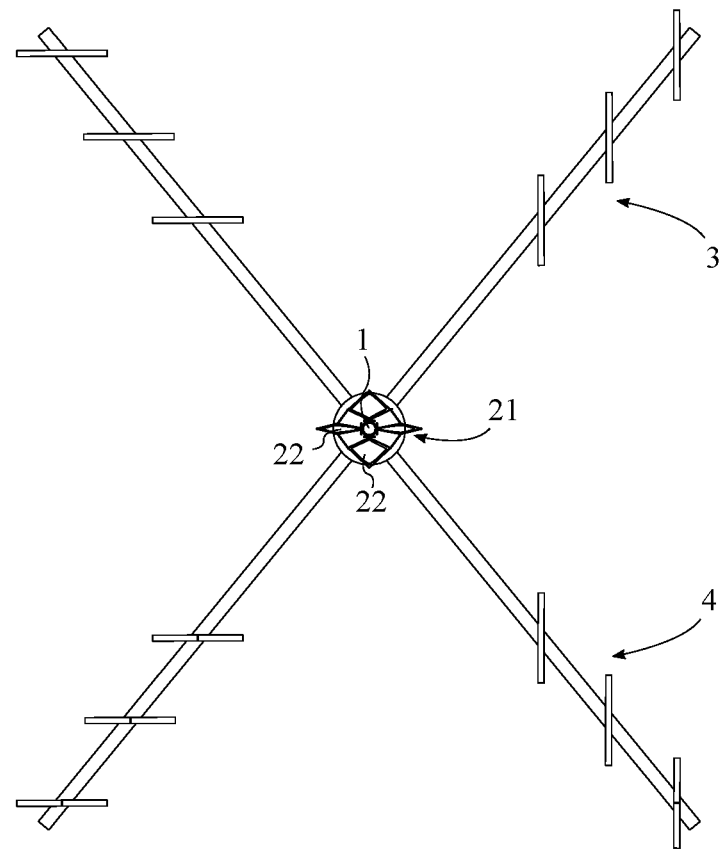
FIG. 7 is a top cross-sectional view of the present invention illustrating the bellows assembly in an exemplary compressed state.
Figure 8:
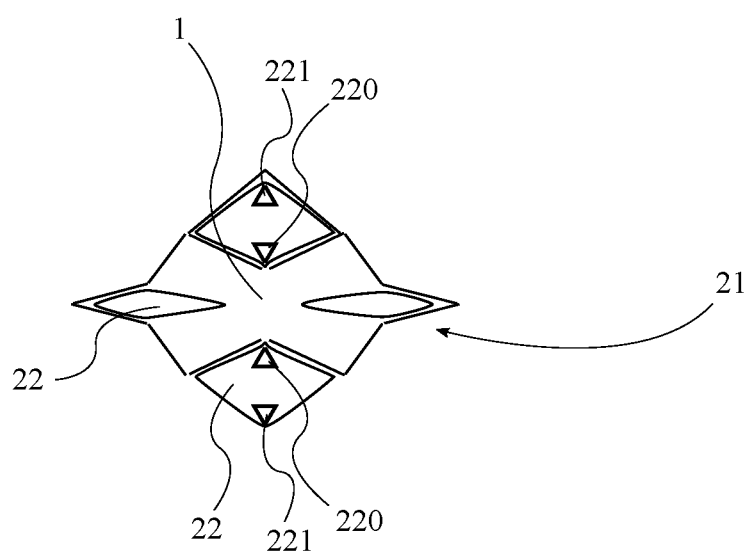
FIG. 8 is a detail view of the bellows assembly of FIG. 7.

Preferably, the first plurality of vanes 42 and the second plurality of vanes 43 are each serially positioned adjacent to each other, though the specific arrangement of the first plurality of vanes 42 and the second plurality of vanes 43 may vary in different embodiments. The first plurality of vanes 42 and the second plurality of vanes 43 are positioned opposite each other along the support frame 41, with the central shaft 1 being positioned between the first plurality of vanes 42 and the second plurality of vanes 43 for both the first lever arm assembly 3 and the second lever arm assembly 4. In some embodiments, the central shaft 1 vertically traverses through the first lever arm assembly 3 and the second lever arm assembly 4. Furthermore, the first plurality of vanes 42 and the second plurality of vanes 43 are selectably oriented at an opposing angle 400 to each other, as shown in FIG. 3.

The vane rotation mechanism 44 is operatively connected to each of the first plurality of vanes 42 and the second plurality of vanes 43 for the first lever arm assembly 3 and the second lever arm assembly 4, wherein the vane rotation mechanism 44 is configured to simultaneously rotate each of the first plurality of vanes 42 and the second plurality of vanes 43.

It is contemplated that in various embodiments, the generator 2 may vary. In various embodiments, the generator 2 may be configured to convert the rotational motion of the first lever arm assembly 3 and the second lever arm assembly 4 into mechanical energy, electrical energy, or any applicable type of energy. Furthermore, the generator 2 may vary in specific implementation and means to facilitate said conversion. However, in the preferred embodiment, the generator 2 comprises a bellows assembly 21 and a flexible chamber 22, as shown in FIGS. 5-8. The bellows assembly 21 is positioned around the central shaft 1, and the flexible chamber 22 is positioned within the bellows assembly 21, wherein the bellows assembly 21 is configured to compress the flexible chamber 22. The first lever arm assembly 3 and the second lever arm assembly 4 are operatively connected to the bellows assembly 21, such that the first lever arm assembly 3 and the second lever arm assembly 4 are configured to operate the bellows assembly 21 in order to compress the flexible chamber 22.

More particularly, in the preferred embodiment, in the preferred embodiment, the bellows assembly 21 is positioned between the first lever arm assembly 3 and the second lever arm assembly 4, and furthermore the bellows assembly 21 is connected to the support frame 41 of the first lever arm assembly 3 and the second lever arm assembly 4. Thus, as the first lever arm assembly 3 and the second lever arm assembly 4 rotate about the central shaft 1, the rotational motion of the first lever arm assembly 3 and the second lever arm assembly 4 is transferred to the bellows assembly 21, which is suitably configured to convert said rotational motion into compressive force in order to compress the flexible chamber 22.

This compression of the flexible chamber 22 by the bellows assembly 21, which is in turn operated by the first lever arm assembly 3 and the second lever arm assembly 4, is the mechanism through which the present invention ultimately converts wind energy captured by the vanes into energy. The flexible chamber 22 may be configured in any applicable means to expel air or other fluid, which may be captured through various means and converted into useful mechanical or electrical energy. In various embodiments, the flexible chamber 22 may comprise an intake valve 220 and an exhaust valve 221. The intake valve 220 and the exhaust valve 221 are each one-way valves, so that the intake valve 220 is configured to receive air or other fluid into the flexible chamber 22 during an intake stroke of the lever arm assemblies, while the exhaust valve 221 is configured to expel air from the flexible chamber 22 during an exhaust stroke of the lever arm assemblies. As discussed, the exhaust valve 221 may be operatively connected to any suitable means for converting the fluid expelled from the flexible chamber 22 through the exhaust valve 221 into mechanical or electrical energy, such as, but not limited to, a pneumatic generator, or a pump, or flywheel, or any other applicable means of energy conversion.

Figure 9:
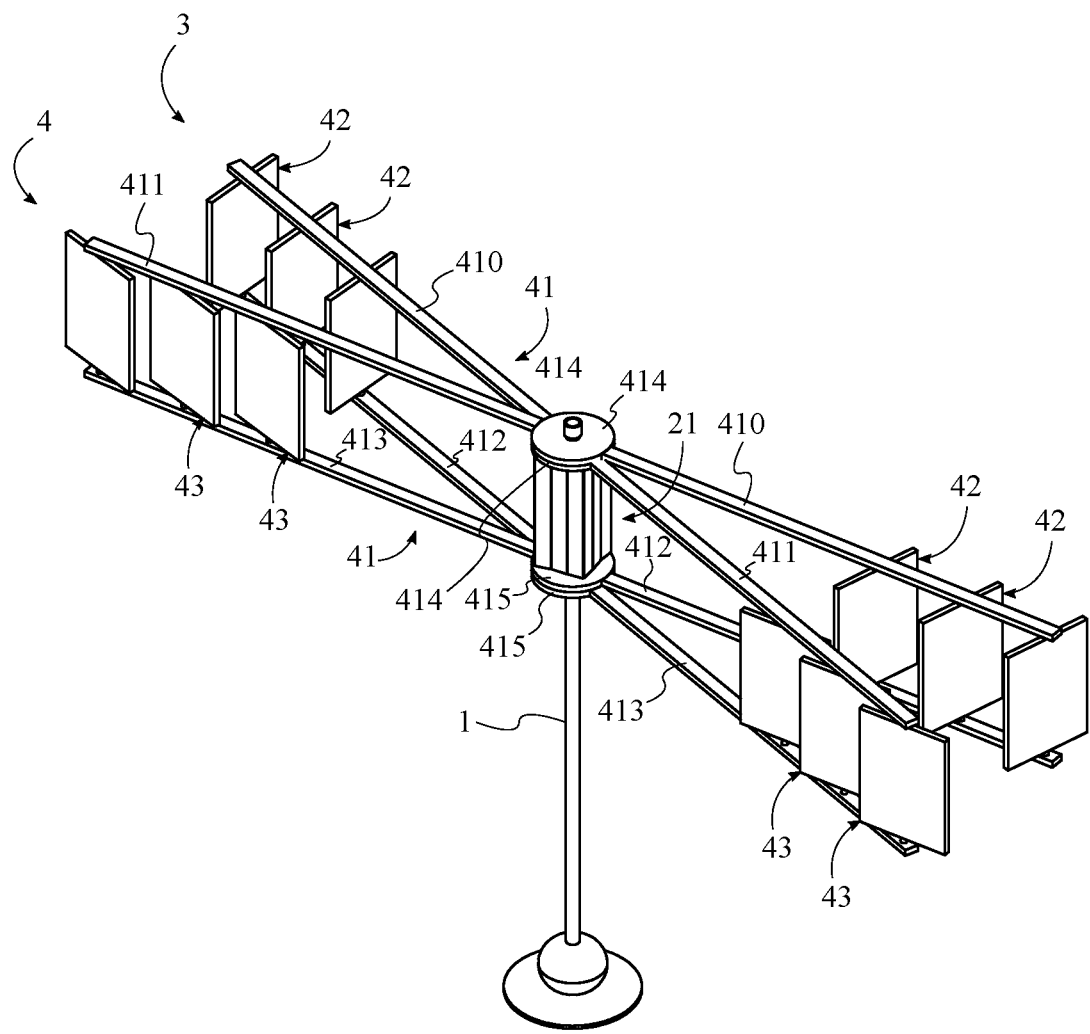
FIG. 9 is a perspective view of the present invention.

In the preferred embodiment, as shown in FIG. 9, the support frame 41 of each of the first lever arm assembly 3 and the second lever arm assembly 4 comprises a first upper arm 410, a second upper arm 411, a first lower arm 412, a second lower arm 413, an upper central member 414, and a lower central member 415.

For each of the first lever arm assembly 3 and the second lever arm assembly 4, the first upper arm 410 is terminally connected to the upper central member 414, and the second upper arm 411 is terminally connected to the upper central member 414 opposite the first upper arm 410. Similarly, the first lower arm 412 is terminally connected to the lower central member 415, and the second lower arm 413 is terminally connected to the lower central member 415 opposite the first lower arm 412. The upper central member 414 and the lower central member 415 are rotatably positioned around the central shaft 1.

In the preferred embodiment, the first plurality of vanes 42 of the first lever arm assembly 3 is perpendicularly and rotatably connected between the first upper arm 410 and the first lower arm 412 of the support frame 41 of the first lever arm assembly 3. Similarly, the second plurality of vanes 43 of the first lever arm assembly 3 is perpendicularly and rotatably connected between the second upper arm 411 and the second lower arm 413 of the support frame 41 of the first lever arm assembly 3.

Furthermore, the first plurality of vanes 42 of the second lever arm assembly 4 are perpendicularly and rotatably connected between the first upper arm 410 and the first lower arm 412 of the support frame 41 of the second lever arm assembly 4, while the second plurality of vanes 43 of the second lever arm assembly 4 are perpendicularly and rotatably connected between the second upper arm 411 and the second lower arm 413 of the support frame 41 of the second lever arm assembly 4. Moreover, the bellows assembly 21 is connected between the upper central member 414 of the first lever arm assembly 3 and the lower central member 415 of the second lever arm assembly 4. It is not of particular consequence to which central members the bellows assembly 21 is connected. The upper central members 414 of the first and second lever arm assembly 4 are stacked atop each other, while the lower central member 415 of the lever arm assemblies are also stacked atop each other, so the bellows assembly 21 should be connected between whichever upper central member 414 and lower central member 415 is closer to the bellows assembly 21.

Figure 10:
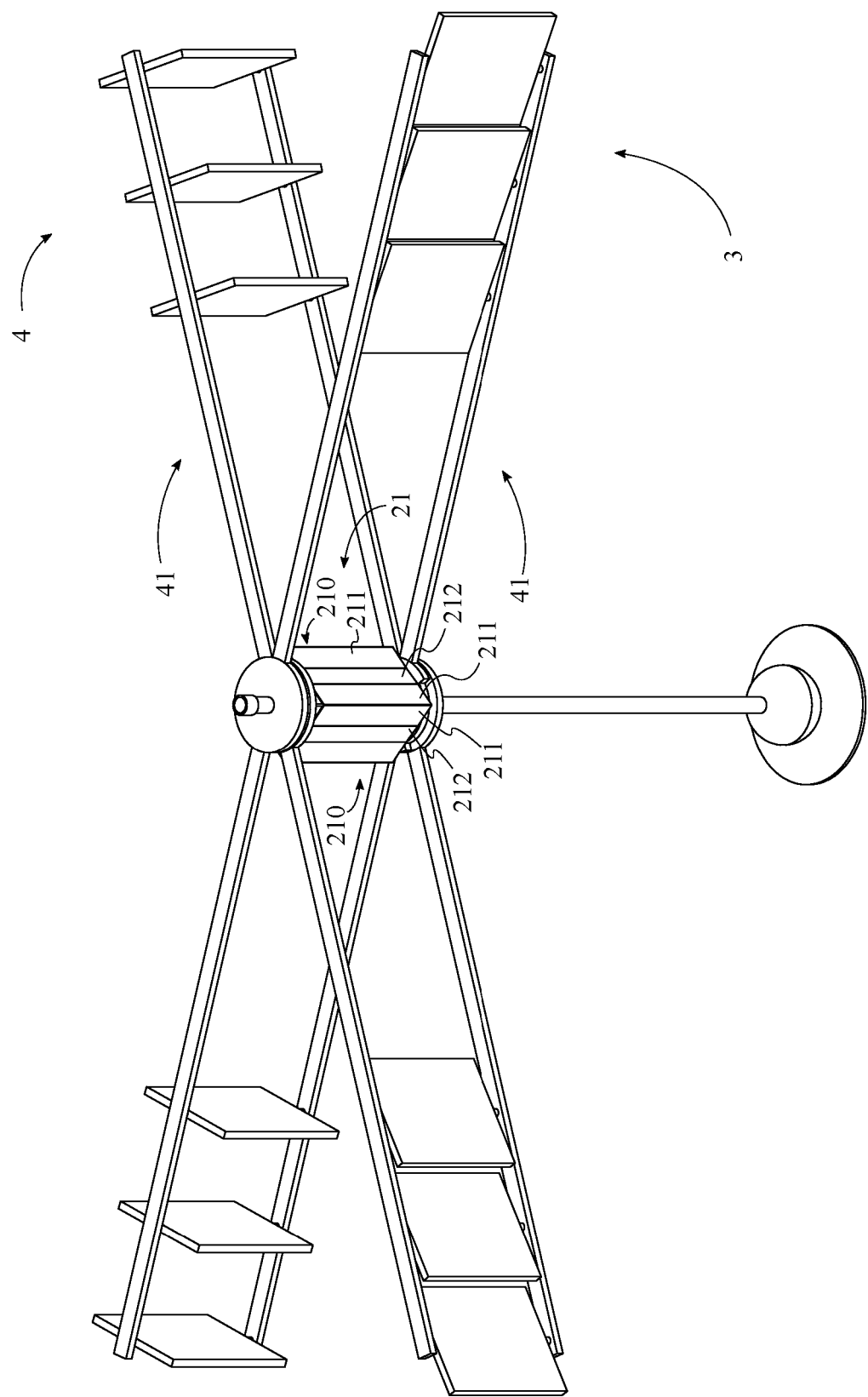
FIG. 10 is a front raised perspective view of the present invention.

In various embodiments, the bellows assembly 21 may vary, and may comprise any components and arrangement thereof suitable for converting the rotational motion of the lever arm assemblies into compressive force in order to compress the flexible chamber 22. Referring to FIG. 10, in some embodiments, the bellows assembly 21 comprises a plurality of plates 210. The plurality of plates 210 is serially positioned adjacent to each other in a closed loop, and are terminally and hingedly connected to each other. Various members of the plurality of plates 210 are connected to the support frame 41 of the lever arm assemblies such that at different extents of the arc traced by the lever arm assemblies, the plurality of plates 210 foldably contract and expand in order to compress and expand the flexible chamber 22.

Moreover, in some embodiments, the plurality of plates 210 comprises a plurality of pairs of corner plates 211 and a plurality of intermediate plates 212. Each intermediate plate is positioned between two of the pairs or corner plates 211, and each of the pair of corner plates 211 is rotatably connected between the support frame 41 of the first lever arm assembly 3 and the support frame 41 of the second lever arm assembly 4.

More particularly, in some embodiments each of the plurality of pairs of corner plates 211 is hingedly connected to each other by one of a plurality of pins 213. Each of the plurality of pins 213 is connected between upper and lower members of either the first lever arm assembly 3 or the second lever arm assembly 4 in order to remain vertical and fixed in place relative to its respective lever arm assembly. Thus, the plurality of pins 213 provides multiple points at which the plurality of plates 210 are fixed relative to one of the lever arm assemblies so that the plurality of plates 210 may be manipulated relative to each other in order to fold in such a manner as to produce compressive force and compress the flexible chamber 22.

Figure 11:
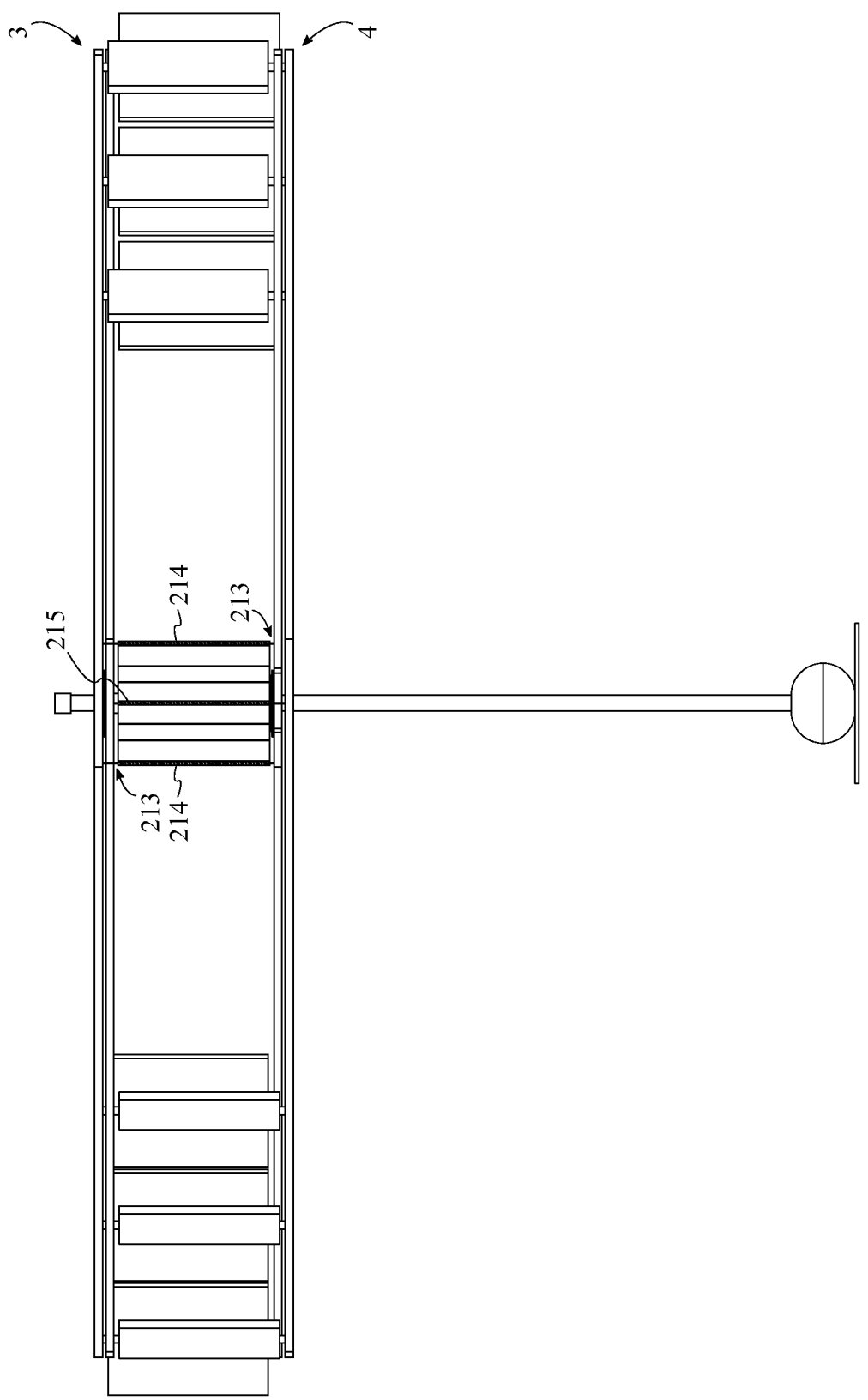
FIG. 11 is a front view of the present invention illustrating the plurality of pins.

More particularly, in some embodiments the plurality of pins 213 comprises a first plurality of pins 214 and a second plurality of pins 215, as shown in FIG. 11. The first plurality of pins 214 is connected between the upper central member 414 and the lower central member 415 of the first lever arm assembly 3, while the second plurality of pins 215 is connected between the upper central member 414 and the lower central member 415 of the second lever arm assembly 4. Thus, the manipulation points of the bellows assembly 21 are separated into two sets of manipulation points, each of which is affected by the independent rotational motion of one of the lever arm assemblies.

In some embodiments, the plurality of plates 210 of the bellows assembly 21 comprises nine plates, and the plurality of pins 213 comprises four pins. The nine plates may be arranged to form a square or similar rectangle, and the four pins are connected to the corners of said square, so that three plates are between any given two pins, including the plates connected to the pins. Thus, the plurality of pins 213 is equally spaced along the plurality of plates 210. However, it is contemplated that various geometries may be utilized with varying numbers of plates and pins in order to create suitable foldable geometry to convert the rotational motion of the lever arm assemblies into compressive force to compress the flexible chamber 22 within the bellows assembly 21.

Figure 12:
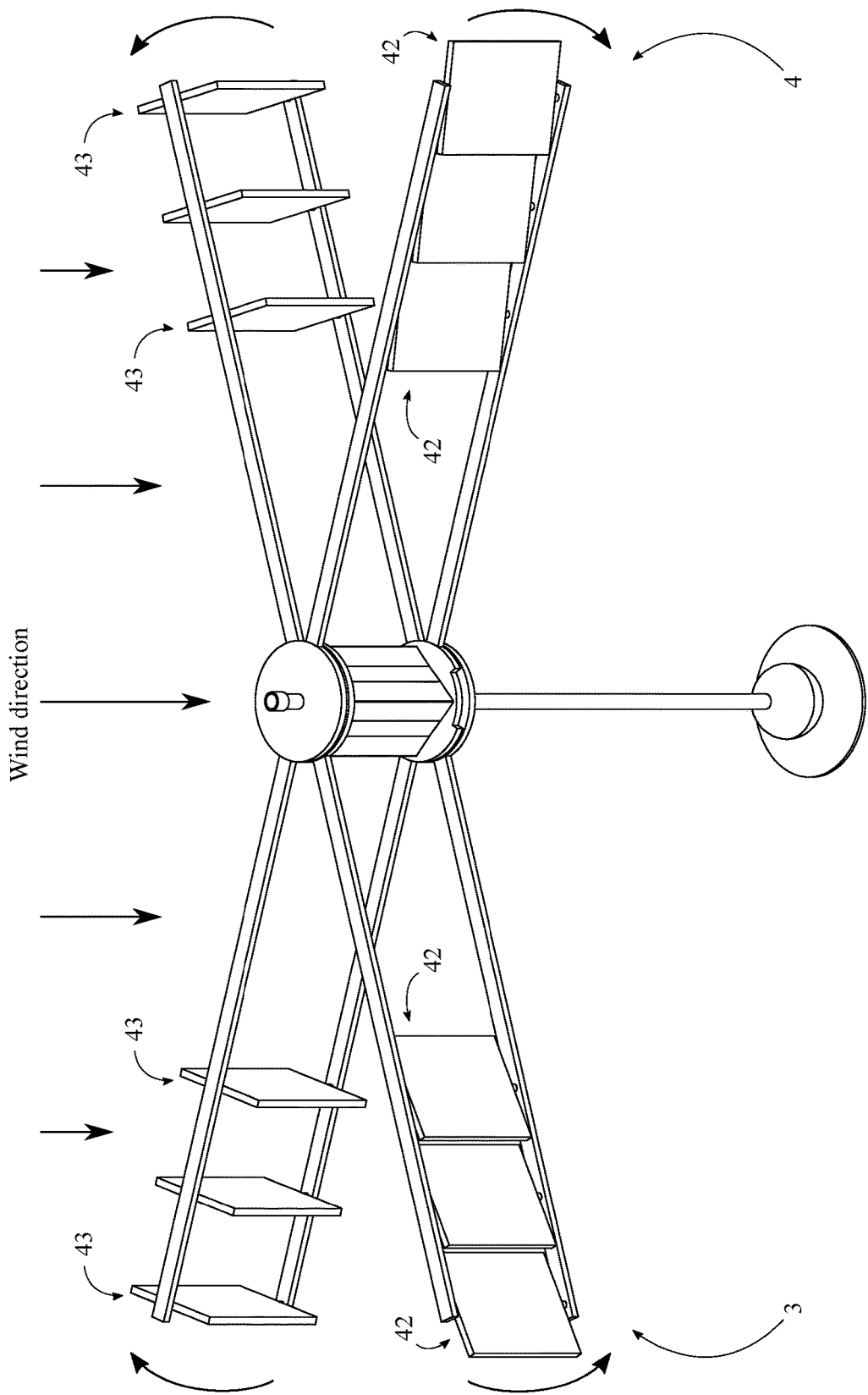
FIG. 12 is a front raised perspective view of the present invention illustrating motion of the lever arm assemblies due to wind force.

The vane rotation mechanism 44 is an important feature of the present invention, enabling the reciprocal and opposing rotational motion of the lever arm assemblies to produce reciprocating compressive force through the bellows assembly 21. To proceed with the present disclosure, consider an elevated side view of the present invention shown in FIG. 12, wherein the first plurality of vanes 42 of the first lever arm assembly 3 and the first plurality of vanes 42 of the second lever arm assembly 4 are closest to the point of view, with the first plurality of vanes 42 of the first lever arm assembly 3 on the left side of the side view and the first plurality of vanes 42 of the second lever arm assembly 4 on the right side of the side view. Thus, the second plurality of vanes 43 of the first lever arm assembly 3 is positioned at the right rear of the elevated perspective view, and the second plurality of vanes 43 of the second lever arm assembly 4 is positioned at the left rear of the elevated perspective view. The vanes closest to the point of view should be oriented parallel to each other and the vanes further from the point of view should similarly be oriented parallel to each other. However, the closer vanes and the further vanes should be oriented perpendicular to each other. Thus, the first plurality of vanes 42 and the second plurality of vanes 43 for both the first lever arm assembly 3 and the second lever arm assembly 4 should be oriented perpendicular to each other, or generally perpendicular, if not exactly.

Proceeding, it is assumed that a wind gust is blowing toward the point of view. Force will be applied primarily to the set of vanes, either closer or farther, which is substantially perpendicular to the direction of the gust of wind, or in the current example, perpendicular to the point of view. If the closer vanes are oriented substantially perpendicular to the point of view, the first plurality of vanes 42 of the first lever arm assembly 3 and the first plurality of vanes 42 of the second lever arm assembly 4 will be forced toward the point of view, causing the first lever arm assembly 3 to rotate counterclockwise, while the second lever arm assembly 4 rotates clockwise, thus producing the opposing rotation motion of the lever arm assemblies.

Figure 13:
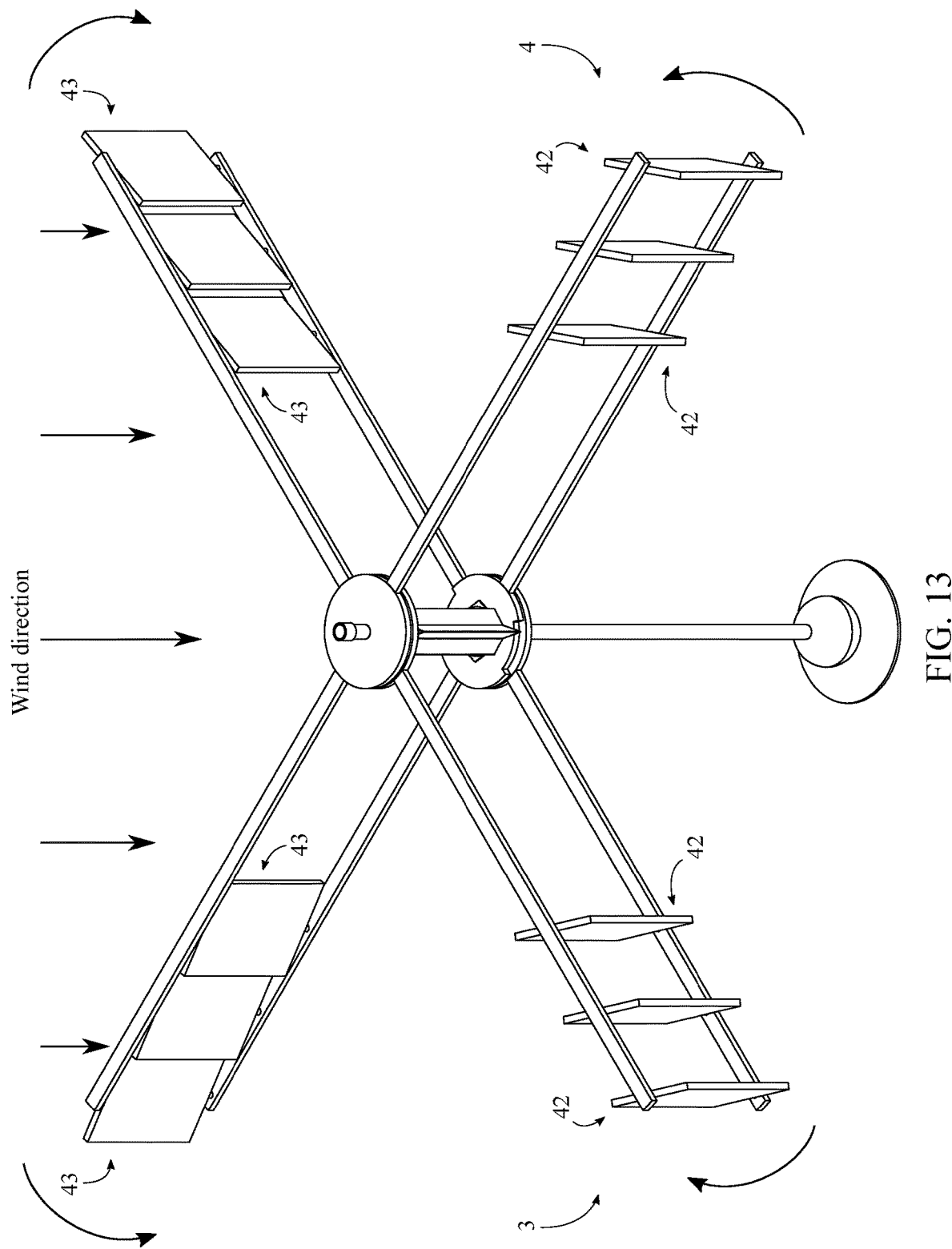
FIG. 13 is a front raised perspective view of the present invention illustrating motion of the lever arm assemblies due to wind force.
Figure 14:
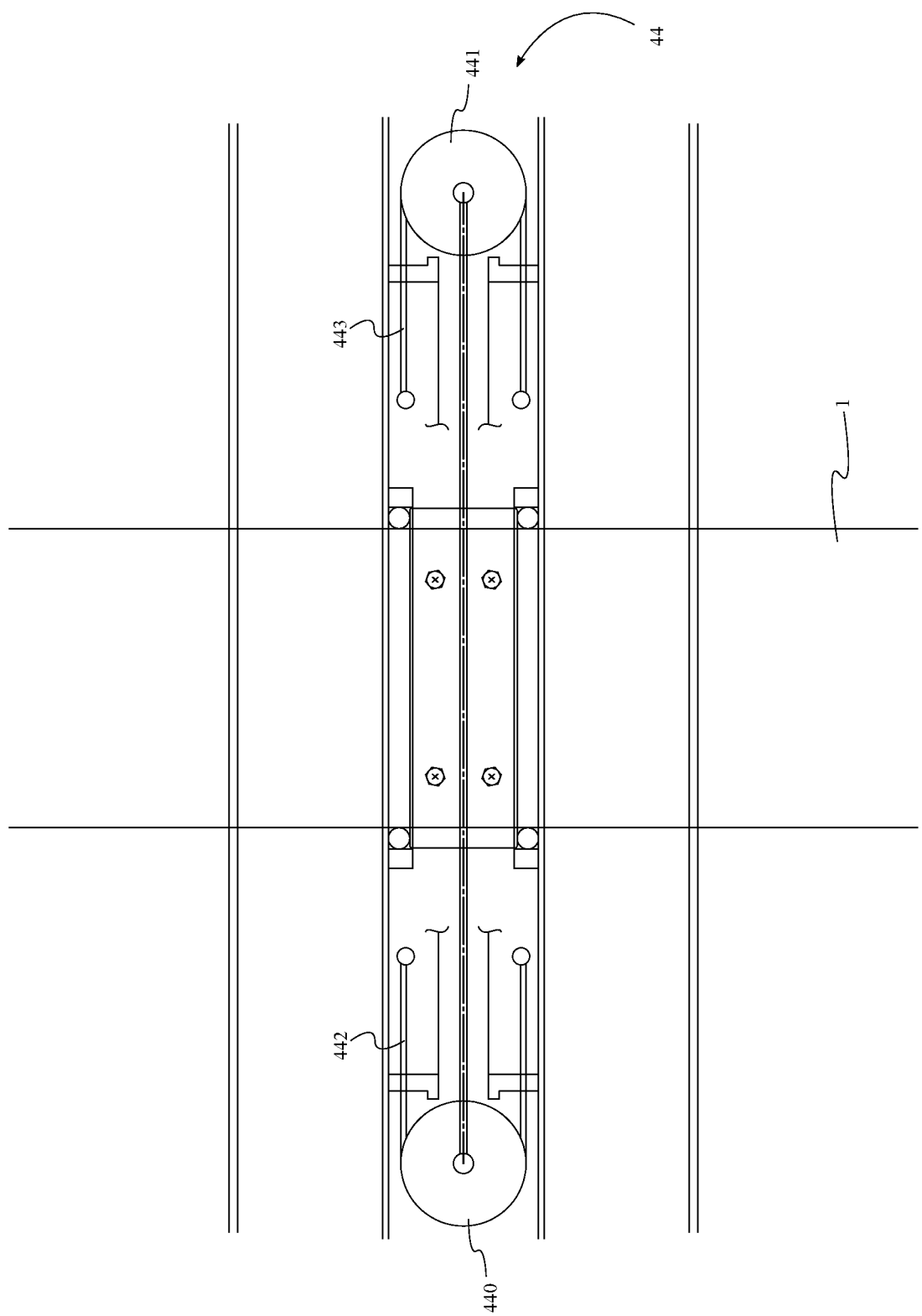
FIG. 14 is an exemplary partial illustration of the vane rotation mechanism.
Figure 15:
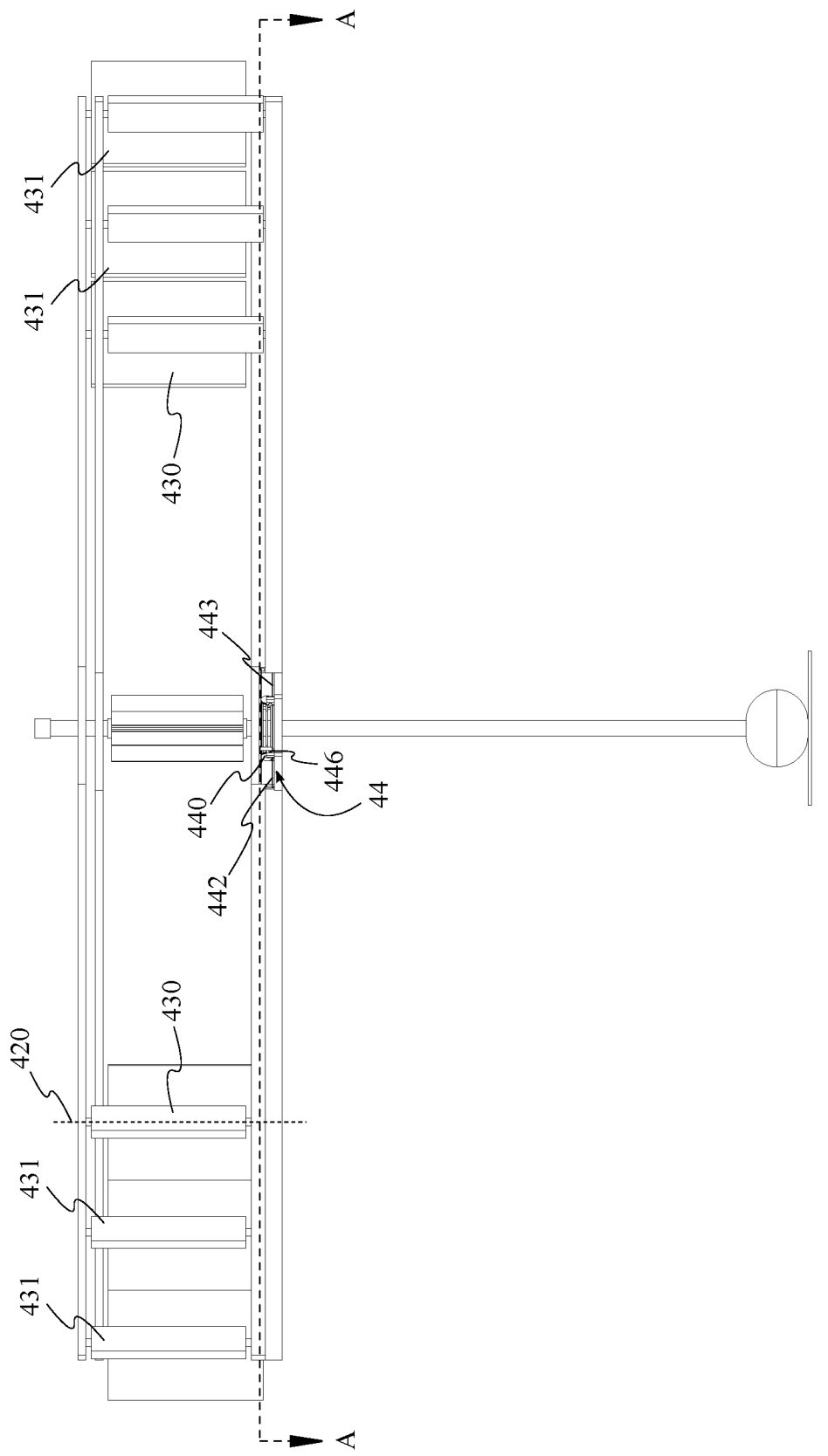
FIG. 15 is a front view of the present invention illustrating the vane rotation mechanism.

Once the lever arm assemblies reaches the maximum extent of their arcs, the vane rotation mechanism 44 will cause all of the vanes to change orientation by 90 degrees. Then, as illustrated in FIG. 13, the closer vanes will be parallel to the wind direction, while the farther vanes are perpendicular to the wind direction, causing the majority of wind force to be applied to the rear vanes, thus reversing the previous motion and causing the first lever arm assembly 3 to rotate clockwise while the second lever arm assembly 4 rotates counterclockwise. Thus, the reciprocating rotational opposing motion of the present invention is facilitated through the vane rotation mechanism 44.

The specific means through which the vane rotation mechanism 44 may vary in different embodiments, and may take any form that is suitable to the aforementioned purpose. Referring to FIGS. 14-17, in the preferred embodiment, for each of the first lever arm assembly 3 and the second lever arm assembly 4, the vane rotation mechanism 44 comprises at least one first pulley 440, at least one second pulley 441, at least one first vane cable 442, at least one second vane cable 443, a first actuator 444, a second actuator 445, a first switch 446, and a second switch 447. In some embodiments, the at least one first pulley 440 and the at least one second pulley 441 of the vane rotation mechanism 44 are connected adjacent to the central shaft 1, though their placement may vary in different embodiments.

Figure 16:
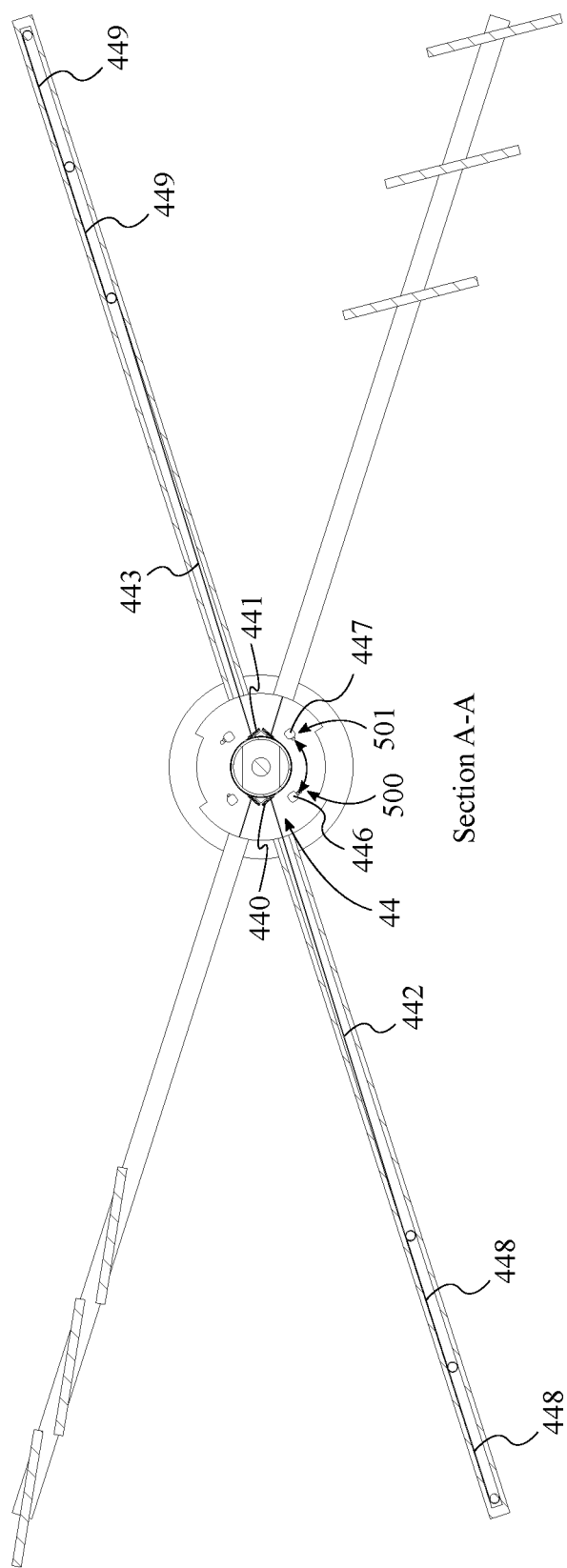
FIG. 16 is a top cross-sectional view along line A-A of FIG. 13 illustrating the vane rotation mechanism.
Figure 17:
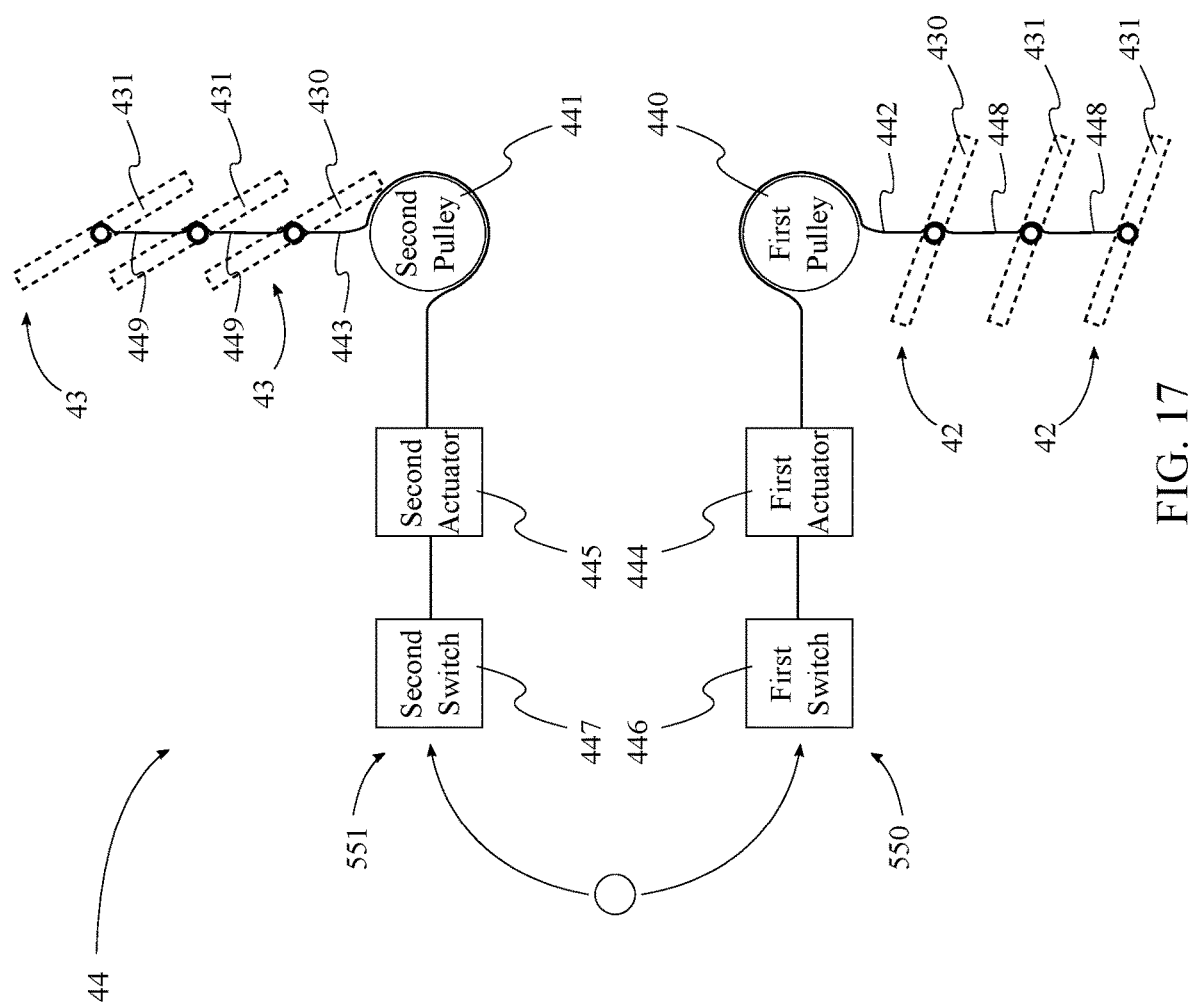
FIG. 17 is a general schematic diagram of the vane rotation mechanism.

The first switch 446 is electrically connected to the first actuator 444, and the second switch 447 is electrically connected to the second actuator 445. The vane rotation mechanism 44 is configured to activate the first switch 446 at a first arc extent 500 as shown in FIG. 16, while the vane rotation mechanism 44 is configured to activate the second switch 447 at a second arc extent 501, wherein the first arc extent 500 and the second arc extent 501 represent the extents of the arcs traced by the lever arm assemblies. In some embodiments, each switch is activated through physical contact by one of the lever arm assemblies as it travels to one of the extents of its arc. Thus, the first arc extent 500 and the second arc extent 501 are defined by the placement of the first switch 446 and the second switch 447 in combination with any relevant portion of a respective lever arm assembly.

The first vane cable 442 is engaged with the first pulley 440 and connected between the first actuator 444 and at least one of the first plurality of vanes 42, wherein the first actuator 444 is configured to rotate the at least one of the plurality of vanes through the first vane cable 442. Similarly, the second vane cable 443 is engaged with the second pulley 441 and connected between the second actuator 445 and one of the second plurality of vanes 43, wherein the second actuator 445 is configured to rotate the at least one of the second plurality of vanes 43 through the second vane cable 443. Furthermore, each of the first plurality of vanes 42 is rotatably coupled, and each of the second plurality of vanes 43 is rotatably coupled. In the preferred embodiment, the actuators are solenoids, which upon actuation, pulls a piston, plunger or similar element, applying tension to the attached cable. The cable is affixed to a rotational axis of its respective vane, so that tensioning the cable turns the rotational axis, and thus the entire vane. The angle the vane is rotated by may be controlled by controlling the distance the plunger of the solenoid travels upon activation. The change angle of the vane should be approximately 90 degrees in the preferred embodiment, through the change angle may vary as desired in various embodiments.

Furthermore, in the preferred embodiment, the first plurality of vanes 42 and the second plurality of vanes 43 each comprise a master vane 430 and a plurality of slave vanes 431, while the vane rotation mechanism 44 comprises at least one first slave cable 448 and at least one second slave cable 449. The master vane 430 of the first plurality of vanes 42 is rotatably coupled with each of the plurality of slave vanes 431 of the first plurality of vanes 42 through the at least one first slave cable 448, while the master vane 430 of the second plurality of vanes 43 is rotatably coupled with each of the plurality of slave vanes 431 of the second plurality of vanes 43 through the at least one second slave cable 449. The first vane cable 442 is connected between the first actuator 444 and the master vane 430 of the first plurality of vanes 42, wherein the first actuator 444 is configured to rotate the master vane 430 of the first plurality of vanes 42 through the first vane cable 442, and the second vane cable 443 is connected between the second actuator 445 and the master vane 430 of the second plurality of vanes 43, wherein the second actuator 445 is configured to rotate the master vane 430 of the second plurality of vanes 43 through the second vane cable 443.

The following is an alternate, exemplary description of the present invention and is intended to further demonstrate the spirit of the present invention along with various details which may be implemented in different embodiments and should not be considered to be limiting.

The present invention is a pump assembly. More specifically, the pump assembly is a current-powered compressive pump that harnesses current-power for electrical and/or compressive energy generation using a self-oscillating, scissor-like motion, and compressive mechanism, rather than convention radial wind turbines that exist today. In the preferred embodiment of the present invention, the pump assembly is used for wind-powered applications such that the pump generates pneumatic and/or electrical energy. In another embodiment of the present invention, the pump assembly can be adapted for undercurrent applications, such that the pump is submerged and positioned in ocean/river undercurrents. In the preferred embodiment of the present invention, the pump assembly can operate at ground level, such that the pump assembly progresses to an optimal height. In another embodiment of the present invention, the pump assembly can be pre-positioned to an optimal height. In another embodiment of the present invention, the pump assembly can be adapted for undercurrent applications such that the pump assembly can harness ocean/river undercurrents. In various embodiments of the present invention, the pump assembly can be attached on to a compressive air generator (turbine), and/or any type of pneumatic powered device. In another embodiment of the present invention, the pump assembly can be hooked on to a filter/scrubber device, such that the device can remove particulate air pollution. A specific combination of electrical/pneumatic energy generation, and filtration applications can also be adapted to the pump assembly, dependent on the application of usage. The pump assembly comprises: a mast, a rotor, a bellows, a diaphragm, and a plurality of struts. The mast is the mounting system of the pump assembly that is placed on any viable site for the pump assembly to operate. More specifically, the mast is fixed on to the ground such that it is erected to a desired/optimal length for the pump assembly to efficiently harness atmospheric mass current flow. The mast further comprises: a base, a pole, and a stopper. The base is fixed on to the ground of the proposed installation site of the mast assembly. More specifically, the base serves as the foundation of the pump assembly, such that it prevents the pump assembly from shearing/tipping off the ground. The base further comprises a riser. The riser proceeds after the base, opposite to the ground. More specifically, the riser is a protruded section of the base that raises the rotor off the ground, such that the pump assembly can operate on the riser end of the base and/or prevents the rotor from directly contacting the ground. he pole is fixed on to the base. Additionally, Tthe pole traverses through the riser. More specifically, the pole is the main body of the mast that allows the rotor to slide along its length. In the preferred embodiment of present invention, the pole allows the rotor to progressively reach the optimal height of mass current flow harness operation from the riser end of the mast. In another embodiment of the present invention, the pole can fix the rotor assembly to the optimal height of mass current flow harness operation. The stopper is positioned at the end of the pole, opposite to the base end. More specifically, the stopper secures the rotor from progressing beyond the optimal height of mass current flow harness operation. In another embodiment of the present invention, the stopper may mount the rotor to the optimal height of mass current flow harness operation such that the rotor stays stationary along the stopper end of the mast. The rotor concentrically aligned with the pole. Additionally, the rotor is secured on to the pole, such that the rotor can slide freely along the riser end to the stopper end of the pole. In another embodiment of the present invention, the rotor can be secured on to the stopper end of the pole, such that the rotor stays up on the stopper end of the pole during operation/in-operation of the pump assembly. More specifically, the rotor is the current harnessing member of the pump assembly that converts current-power in to usable mechanical energy for the bellows system. Additionally, the rotor serves as the mounting platform for the bellows system. Furthermore, the rotor specifically employs, an auto-oscillating, scissoring mechanism that compresses/expands the bellows system. In the preferred embodiment of the present invention, the rotor lifts off the riser by inflating the bag, such that the bag expands and moves the rotor up the mast assembly. In another embodiment of the present invention, the rotor can be lifted up along the mast as a high flying "self-oscillating kite" such that the span of the rotor acts as lift generating airfoils. The rotor further comprises: a sleeve, a plurality of cans, a plurality of synchronizers, a plurality of first levers, a plurality of second levers, a plurality of first vanes, a plurality of second vanes, a plurality of third vanes, a plurality of fourth vanes, a bracket, a plurality of actuators, a switch, a power supply, and a plurality of inductors. The sleeve is concentrically aligned with the pole. More specifically, the sleeve serves as the main mounting member of the rotor that secures the rotor on to the pole. Additionally, the sleeve serves as the main body of the rotor that attaches associative components of the bellows system. The plurality of cans is concentrically aligned with the pole. Additionally, the plurality of cans is positioned at the ends of the sleeve. Furthermore, the plurality of cans rotates freely along the pole. More specifically, the plurality of cans houses and secures the associative components of the rotor, specifically the current capturing members and electronic components. In the preferred embodiment of the present invention, the plurality of cans can comprise a first set, a second set, and a plurality of bearings. In various embodiments of the present invention, the plurality of cans can comprise a plurality of sets, dependent on the application of use. The first set is adjacent to the stopper end of the pole. More specifically, the first set makes up the primary module of plurality of cans. The second set proceeds the first set. More specifically, the second set make up the secondary module of plurality of cans. In another embodiment of the present invention, a plurality of second sets can proceed after the first set. The plurality of bearings is concentrically aligned with the plurality of cans and the pole. Additionally, the plurality of bearings secures on the ends of the plurality of cans. More specifically, the plurality of bearings allows the plurality of cans to slide and/or rotate freely along the pole. The plurality of synchronizers is located in between the first set and the second set of the plurality of cans. More specifically, the synchronizer bridges the first set to the second set such that the second set rotates in conjunction and opposite to the second set. Additionally, the synchronizer optimizes the oscillating motion of the pump assembly during operation, such that the expansion/contraction of the rotor correlates to the expansion/contraction of the bellows system. In the preferred embodiment of the present invention, the synchronizer takes form of a sheave/wire mechanism, but can take form of any viable mechanism, i.e. gearbox, pneumatic direction module, etc. The synchronizer further comprises: a plate, a plurality of rings, a plurality of pulleys, and a plurality of cables. The plate resides in between the plurality of cans, specifically between the spaces of the first set and the second set. Additionally, the plate is concentrically aligned with the pole. More specifically, the plate is the main body of the synchronizer that serves as a platform for the plurality of pulleys and plurality of cables. The plurality of rings is positioned on the first set side, and the second set side of the plate. Additionally, the plurality of rings is fixed on the inner surface of the first set and the second set directed towards the plate. More specifically, the plurality of rings serves as connection platforms for the plate such that the plate can be connected along the first set and the second set of the plurality of cans. The plurality of pulleys is located on the ends of the plate. More specifically, the plurality of pulleys serves as connection points for the plurality of cables, such that it routes, and guides the plurality of cables along the plate and to the plurality of rings. Additionally, the plurality of pulleys allows the traversing cables to move freely along plate. The plurality of cables is attached between the plurality of rings and the plate. Additionally, the plurality of cables traverses from the first set to the second set of the plurality of cans, specifically wrapping around the corresponding pulley located on the plate and attaching to the plurality of rings. More specifically, the plurality of cables bridges the first set and the second set together, such that the first set rotates in an equal and opposite radial motion, relative to the second set. The plurality of first levers is located on the first set of the plurality of cans. Additionally, the plurality of first levers mid-sectionally spans the horizontal profile of the first set of the plurality of cans, parallel to the base. Furthermore, the plurality of first levers vertically traverses from the first set. More specifically, the plurality of first levers serves as the frame of the current harnessing member associative with the first set of the plurality of cans. In another embodiment of the present invention, the plurality of first levers can be configured to act as lift generating airfoils, such that it lifts the rotor up the mast assembly. The plurality of first levers further comprises: a first wing, and a second wing. The first wing is attached on to the first set of the plurality of cans. More specifically, the first wing is one section of the plurality of first levers that rotates along the axial profile of the first set. The second wing is attached on to the first set of the plurality of cans, opposite and colinear to the first wing. More specifically, the second wing is the other section of the plurality of first levers that rotates along the axial profile of the first set. The plurality of second levers is located on the second set of the plurality of cans. Additionally, the plurality of second levers mid-sectionally spans the horizontal profile of the second set of the plurality of cans, parallel to the base and plurality of first levers. Furthermore, the plurality of second levers vertically traverses from the second set. More specifically, the plurality of second levers serves as the frame of the current harnessing member associative with the second set of the plurality of cans. In another embodiment of the present invention, the plurality of second levers can be configured to act as lift generating airfoils, such that it works in conjunction with the plurality of first levers in lifting the rotor up the mast assembly. The plurality of second levers further comprises: a third wing, and a fourth wing. The third wing is attached on to the second set of the plurality of cans. More specifically, the third wing is one section of the plurality of second levers that rotates along the axial profile of the second set. The fourth wing is attached on to the second set of the plurality of cans, opposite and colinear to the third wing. More specifically, the fourth wing is the other section of the plurality of second levers that rotates along the axial profile of the second set. The plurality of first vanes resides on the distal end of the first wing of the plurality of first levers. More specifically, the plurality of first vanes serves as current harnessing flaps that sails along the direction of mass current flow, relative to the largest cross-sectional area. Additionally, the plurality of first vanes can bypass the mass current flow along the smallest cross-sectional area. Furthermore, the plurality of first vanes is adjustable along the first wing, such that the plurality of first vanes can either bypass, and/or capture mass current flow along the first wing. The plurality of second vanes resides on the distal end of the second wing of the plurality of first levers, opposite to the plurality of first vanes. More specifically, the plurality of second vanes resembles the plurality of first vanes, such that the plurality of second vanes serves as current harnessing flaps for the second wing. The plurality of third vanes resides on the distal end of the third wing of the plurality of second levers. More specifically, the plurality of third vanes resembles the plurality of first vanes, such that the plurality of third vanes serves as current harnessing flaps for the third wing. The plurality of fourth vanes resides on the distal end of the fourth wing of the plurality of second levers, opposite to the plurality of third vanes. More specifically, the plurality of fourth vanes resembles the plurality of first vanes, such that the plurality of fourth vanes serves as current harnessing flaps for the fourth wing. The bracket is fixed on to the pole such that it conforms and aligns to the pole. Additionally, the bracket resides in the plurality of cans, independent from the radial movement of the plurality of cans. More specifically, the bracket is a mounting platform for the plurality of actuators. The plurality of actuators is housed within the plurality of cans such that the plurality of actuators is secured on to the bracket. Additionally, the plurality of actuators traverses through the plurality of first levers and second levers. Furthermore, the plurality of actuators connects to the plurality of first vanes, the plurality of second vanes, the plurality of third vanes, and the plurality of fourth vanes. More specifically, the plurality of actuators manipulates the plurality of first vanes, and the plurality of third vanes open/closed to harness/bypass mass current flow along the first wing and the third wing. Additionally, the plurality of actuators also controls the plurality of second vanes, and the plurality of fourth vanes open/closed to harness/bypass mass current flow along the second wing and the fourth wing. In the preferred embodiment of the present invention, the plurality of actuators takes form of electrically driven, rocker bar actuators, but can be any type of viable actuator system, i.e. pneumatic directors, etc. The switch is housed within the plurality of cans, and is wired in to the plurality of actuators. More specifically, the switch is the controller module of the plurality of actuators that manipulates the first wing and the second wing to closes to capture mass current flow, while the third wing and the third wing opens to bypass mass current flow. The latter then proceeds, causing the plurality of first levers and the plurality of second levers to expand and/or retract from one another, creating a self-oscillating, scissor-like motion along the first set and the second set. The power supply is housed within the plurality of cans and is wired in to the switch and plurality of actuators. More specifically, the power supply provides power to the switch and plurality of actuators. In the preferred embodiment of the present invention, the power supply can take form of electrical batteries and/or capacitors. In another embodiment of the present invention, the power supply can take form of any type of power supply, dependent on the application. The plurality of inductors is housed within the plurality of cans and is wired to the power supply. More specifically, the plurality of inductors serves as power generation modules that converts mechanical movement between the first set and the second set of the plurality of cans in to useable power for the power supply. In the preferred embodiment of the present invention, the plurality of inductors can take form of electrical motion generators, but can be any type of generator system, dependent on the application. The bellows system is attached on to the sleeve portion of the rotor. Additionally, the bellows system is attaches on to the first set and the second set of the plurality of cans. More specifically, the bellows system is the compressive generation unit that expands/retracts along the oscillating motion generated by the rotor. Additionally, the bellows system extracts and directs atmospheric air to the diaphragm. The bellows system comprises: a plurality of axles, a plurality of boxes, a plurality of hinges, a plurality of flaps, and a plurality of valves. The plurality of axles traverses along the sleeve profile of the bellows system. Additionally, the plurality of axles fixes on to the plurality of cans such that the plurality of axles moves in conjunction with the radially oscillating plurality of cans. More specifically, the plurality of axles bridges the bellows system to the rotor, such that the bellows can retract/expand in conjunction to the retraction/expansion of the plurality of first levers, and the plurality of second levers. The plurality of boxes is attached on the sleeve portion of the rotor. More specifically, the plurality of boxes is a series of piano hinged panels that serves as the main bellows compressive system. The plurality of boxes compresses and/or retracts along the plurality of axles. The plurality of boxes further comprises: a first box, a second box, a third box, and a fourth box. The first box is located between the first wing and the second wing of the rotor. More specifically, the first box compresses/retracts as the first wing and second wing compresses/retracts from one another, respectively. The second box is located between the second wing and the third wing of the rotor. More specifically, the second box compresses/retracts as the second wing and third wing compresses/retracts from one another, respectively. The third box is located between the third wing and the fourth wing of the rotor. More specifically, the third box compresses/retracts as the third wing and fourth wing compresses/retracts from one another, respectively. Additionally, the third box compresses/retracts in conjunction with the first box. The fourth box is located between the fourth wing and the fourth wing of the rotor. More specifically, the fourth box compresses/retracts as the fourth wing and first wing compresses/retracts from one another, respectively. Additionally, the fourth box compresses/retracts in conjunction with the second box. The plurality of flaps resides in the plurality of boxes. More specifically, the plurality of flaps serves as pneumatic liners that conforms and aligns the inner perimeter of the first box, the second box, the third box, and the fourth box. The plurality of valves is incorporated on the plurality of flaps. More specifically, the plurality of valves is a pair of one-way valves that allows air to enter the plurality of flaps when the plurality of boxes is in expanded configuration, and/or drives air out the plurality of flaps when the plurality of boxes is in the collapsed configuration. The plurality of valves comprises: a first valve, and a second valve. The first valve is attached on to the plurality of flaps. More specifically, the first valve is an inlet valve that allows air to enter the bellows system when the plurality of boxes is in in the expanded configuration. The second valve is attached on to the plurality of flaps. More specifically, the second valve is an outlet valve that allows air to be driven out of the bellows system when the plurality of boxes is in the retracted configuration. The diaphragm is connected to the second valve end of the bellows system. Additionally, the diaphragm traverses from the base end of the mast to the bellows system. More specifically, the diaphragm stores and regulates driven compressive air produced by the bellows system. In the preferred embodiment of the present invention, the diaphragm can also serve as a linear driver for the rotor, such that the diaphragm raises the rotor along the pole as the diaphragm inflates. The diaphragm comprises: a liner and a plurality of ports. The liner traverses from the second valve end of the bellows to the base end of the pump assembly. More specifically, the liner is a pneumatic storage system that stores and/or directs pumped air from the bellows to the base end of the pump assembly. The plurality of ports is attached on to the base end of the liner. More specifically, the plurality of ports serves as pneumatic output ports of the diaphragm, such that the pump assembly can be hooked up to: a turbine, filter, and/or any miscellaneous pneumatic application. Additionally, the plurality of ports can serve as the regulator of the diaphragm, such that it regulates the pressure stored in the liner. In the preferred embodiment of the present invention, the plurality of ports can be regulated to lower/extend the rotor along the length of the pole. The plurality of struts can be incorporated on to the rotor and mast. More specifically, the plurality of struts takes form of a wire and loop system that anchors the stopper end of the mast to the plurality of levers. The plurality of struts comprises: the plurality of loops, and the plurality of wires. The plurality of loops is located on the distal ends of the plurality of first levers, the plurality of second levers, and the stopper. More specifically, the plurality of loops serves as connection member to mount the plurality of wires. The plurality of wires traverses the plurality of loops, such that the plurality of first levers, the plurality of second levers, and the stopper are connected. More specifically, the plurality of wires bridges the rotor on to the stopper.

Although the invention has been explained in relation to its preferred embodiment, it is to be understood that many other possible modifications and variations can be made without departing from the spirit and scope of the invention as hereinafter claimed.

What is claimed is:

1. A reciprocal motion wind energy harvesting device comprising:
   a central shaft;
   a generator;
   a first lever arm assembly;
   a second lever arm assembly;
   the first lever arm assembly and the second lever arm assembly being rotatably and concentrically connected with the central shaft;
   the first lever arm assembly and the second lever arm assembly being operatively connected to the generator, wherein the generator is configured to produce power through rotational motion of the first lever arm assembly and the second lever arm assembly about the central shaft;
   the first lever arm assembly and the second lever arm assembly each comprise a support frame, a first plurality of vanes, a second plurality of vanes, and a vane rotation mechanism;
   the first plurality of vanes and the second plurality of vanes being rotatably connected to the support frame;
   the first plurality of vanes and the second plurality of vanes being positioned opposite each other along the support frame;
   the central shaft being positioned between the first plurality of vanes and the second plurality of vanes for the first lever arm assembly and the second lever arm assembly;
   the first plurality of vanes and the second plurality of vanes being selectably oriented at an opposing angle to each other;
   the vane rotation mechanism being operatively connected to each of the first plurality of vanes and the second plurality of vanes for the first lever arm assembly and the second lever arm assembly, wherein the vane rotation mechanism is configured to simultaneously rotate each of the first plurality of vanes and the second plurality of vanes;
   a flexible chamber of the generator comprises an intake valve and an exhaust valve;
   the intake valve being a one-way valve, wherein the intake valve is configured to receive air into the flexible chamber; and
   the exhaust valve being a one-way valve, wherein the exhaust valve is configured to expel air from the flexible chamber.

2. The reciprocal motion wind energy harvesting device as claimed in claim 1, wherein the central shaft vertically traverses through the first lever arm assembly and the second lever arm assembly.

3. The reciprocal motion wind energy harvesting device as claimed in claim 1, wherein the first lever arm assembly and the second lever arm assembly are each configured to rotate between a first angle and a second angle about the central shaft.

4. The reciprocal motion wind energy harvesting device as claimed in claim 1, wherein the first lever arm assembly and the second lever arm assembly are configured to operate a bellows assembly through relative rotational motion of the first lever arm assembly and the second lever arm assembly about the central shaft.

5. The reciprocal motion wind energy harvesting device as claimed in claim 1 comprising:
   the generator comprising a bellows assembly and a flexible chamber;
   the bellows assembly being positioned around the central shaft;
   the flexible chamber being positioned within the bellows assembly, wherein the bellows assembly is configured to compress the flexible chamber;
   the first lever arm assembly and the second lever arm assembly being operatively connected to the bellows assembly, wherein the first lever arm assembly and the second lever arm assembly are configured to operate the bellows assembly in order to compress the flexible chamber; and
   the bellows assembly being positioned between the first lever arm assembly and the second lever arm assembly.

6. The reciprocal motion wind energy harvesting device as claimed in claim 5 comprising:

the bellows assembly being connected to the support frame of the first lever arm assembly and the second lever arm assembly.

7. The reciprocal motion wind energy harvesting device as claimed in claim 1 comprising:
the exhaust valve being operatively connected to a pneumatic generator.

8. The reciprocal motion wind energy harvesting device as claimed in claim 1 comprising:
the support frame of each of the first lever arm assembly and the second lever arm assembly comprises a first upper arm, a second upper arm, a first lower arm, a second lower arm, an upper central member, and a lower central member, the first upper arm being connected to the upper central member, the second upper arm being connected to the upper central member opposite the first upper arm, the first lower arm being connected to the lower central member, the second lower arm being connected to the lower central member opposite the first lower arm, the upper central member and the lower central member being rotatably positioned around the central shaft;
the first plurality of vanes of the first lever arm assembly being perpendicularly and rotatably connected between the first upper arm and the first lower arm of the support frame of the first lever arm assembly;
the second plurality of vanes of the first lever arm assembly being perpendicularly and rotatably connected between the second upper arm and the second lower arm of the support frame of the first lever arm assembly;
the first plurality of vanes of the second lever arm assembly being perpendicularly and rotatably connected between the first upper arm and the first lower arm of the support frame of the second lever arm assembly; and
the second plurality of vanes of the second lever arm assembly being perpendicularly and rotatably connected between the second upper arm and the second lower arm of the support frame of the second lever arm assembly.

9. The reciprocal motion wind energy harvesting device as claimed in claim 8 comprising:
a bellows assembly of the generator being connected between the upper central member of the first lever arm assembly and the lower central member of the second lever arm assembly.

10. The reciprocal motion wind energy harvesting device as claimed in claim 1 comprising:
a bellows assembly of the generator comprising a plurality of plates;
the plurality of plates being serially positioned adjacent to each other; and
the plurality of plates being terminally and hingedly connected to each other.

11. The reciprocal motion wind energy harvesting device as claimed in claim 10 comprising:
the plurality of plates comprising a plurality of pairs of corner plates and a plurality of intermediate plates;
each intermediate plate being positioned between two of the pairs of corner plates; and
each of the pairs of corner plates being connected between the support frame of the first lever arm assembly and the support frame of the second lever arm assembly.

12. The reciprocal motion wind energy harvesting device as claimed in claim 11 comprising: a plurality of pins; and each of the plurality of pairs of corner plates being hingedly connected to each other by one of the plurality of pins.

13. The reciprocal motion wind energy harvesting device as claimed in claim 12 comprising: the plurality of pins comprising a first plurality of pins and a second plurality of pins; the first plurality of pins being connected between the upper central member and the lower central member of the first lever arm assembly; and the second plurality of pins being connected between the upper central member and the lower central member of the second lever arm assembly.

14. The reciprocal motion wind energy harvesting device as claimed in claim 1 comprising:
the vane rotation mechanism comprising at least one first pulley, at least one second pulley, at least one first vane cable, at least one second vane cable, a first actuator, a second actuator, a first switch, and a second switch;
the first switch being electrically connected to the first actuator;
the second switch being electrically connected to the second actuator;
the vane rotation mechanism being configured to activate the first switch at a first arc extent;
the vane rotation mechanism being configured to activate the second switch at a second arc extent;
the first vane cable being engaged with the first pulley;
the first vane cable being connected between the first actuator and at least one of the first plurality of vanes, wherein the first actuator is configured to rotate the at least one of the first plurality of vanes through the first vane cable;
the second vane cable being engaged with the second pulley;
the second vane cable being connected between the second actuator and one of the second plurality of vanes, wherein the second actuator is configured to rotate the at least one of the second plurality of vanes through the second vane cable;
each of the first plurality of vanes being rotatably coupled; and
each of the second plurality of vanes being rotatably coupled.

15. The reciprocal motion wind energy harvesting device as claimed in claim 13 comprising:
the first plurality of vanes and the second plurality of vanes each comprise a master vane and a plurality of slave vanes;
the vane rotation mechanism further comprising at least one first slave cable and at least one second slave cable;
the master vane of the first plurality of vanes being rotatably coupled with each of the plurality of slave vanes of the first plurality of vanes through the at least one first slave cable;
the master vane of the second plurality of vanes being rotatably coupled with each of the plurality of slave vanes of the second plurality of vanes through the at least one second slave cable;
the first vane cable being connected between the first actuator and the master vane of the first plurality of vanes, wherein the first actuator is configured to rotate the master vane of the first plurality of vanes through the first vane cable; and
the second vane cable being connected between the second actuator and the master vane of the second plurality of vanes, wherein the second actuator is configured to rotate the master vane of the second plurality of vanes through the second vane cable.

16. The reciprocal motion wind energy harvesting device as claimed in claim 1 comprising:
at least one first pulley and at least one second pulley of the vane rotation mechanism being connected adjacent to the central shaft.

* * * * *